United States Patent Office 2,772,968
Patented Dec. 4, 1956

2,772,968

PROCESS OF PULPING CELLULOSIC MATERIALS WITH TRIETHYLENE GLYCOL

Bror L. Grondal and Piotr Zenczak, Seattle, Wash., assignors to Research Corporation, New York, N. Y., a corporation of New York No Drawing. Application June 6, 1951, Serial No. 230,254

1 Claim. (Cl. 92—9)

This invention relates to the pulping of cellulosic material such as wood chips and to the products obtained thereby, especially paper pulp and lignin complex.

An object of the invention is to provide an improved process for the pulping of wood chips and like cellulosic materials that may be carried out at relatively low temperatures and at atmospheric pressure to provide a high quality cellulosic paper pulp and a lignin complex having new and desirable properties.

Another object is to provide such a process that is performed expeditiously and relatively economically and simply.

Another object is to provide a unique lignin complex prepared from wood and similar naturally occurring cellulosic substances.

The foregoing and other objects and advantages of the invention are achieved in a process for pulping cellulosic material including treating said material with triethylene glycol at a temperature and for a time sufficient to substantially dissolve the lignin complex of said material. The cellulosic component of the wood chips, for example, is pulped in the digestion liquor and is thereafter removed, as by filtration or centrifugation, and is further processed, if desired, to produce paper of excellent quality. The digestion liquor, which contains the dissolved lignin complex, is diluted with water and the lignin complex precipitates. The precipitate is separated from the digestion liquor, as by filtration, and is dried to produce a light colored, powdery material having uses in the industrial arts. The digestion liquor is concentrated by evaporation of water therefrom and is reused in the digestion of further quantities of wood chips.

Substantially anhydrous triethylene glycol is employed in the digestion step and the digestion step may be performed in the presence of a catalyst at relatively low temperatures and at atmospheric pressure.

Example

Into an open top, steam jacketed, reaction vessel equipped with a propellor agitator is placed 300 pounds of triethylene glycol and 0.25 pound of aluminum chloride (anhydrous) catalyst. One hundred pounds of wood chips is added to the liquid. Steam is admitted to the heating jacket of the vessel and agitation is commenced.

The temperature of the contents of the vessel is increased to 125° C. within half an hour and this temperature is maintained for two hours while the contents of the vessel are continuously gently agitated. After substantially all water has been driven out of the wood, the lignin complex dissolves very rapidly and defibration occurs in from one to two hours.

After completion of the cook, the digestion liquor is drained from the soft and disintegrated chips. The chips are pressed in a hydraulic press for further recovery of the digestion liquor. After pressing, the chips are washed with fresh triethylene glycol and then with warm water and finally dried in an oven at 60° C.

The dark brown digestion liquor thus recovered is diluted with 1.0 to 1.5 parts by volume of warm water which causes most of the lignin complex to precipitate. The precipitate is recovered by filtration, washed with warm water and dried at 80° C., whereupon it formed a finely divided light gray powder.

The dilute digestion liquor is evaporatively concentrated to a substantially anhydrous condition and is re-used for digesting further quantities of wood chips.

Cellulosic fibers yielded by the digestion operation are very light in color and are made into a kraft paper having high strength and light color.

The light gray lignin complex powder is useful as an adhesive, a binder, surface coating material and molding material.

The process of the invention is applicable to various types of naturally occurring lignin-containing cellulosic materials such as hard and soft wood, deciduous wood and the like.

While the relative quantities of cellulosic material and triethylene glycol used in the digestion treatment are not critical, sufficient triethylene glycol should be used to form a readily workable pulp. From 1 to 4 or more parts by weight of triethylene glycol to 1 part by weight of cellulosic material are employed successfully.

It is desirable to use a catalyst such as aluminum chloride in the digestion stage. Metallic halides and mineral acids, especially halogen acids such as hydrochloric acid are useful in this regard. Such catalysts are termed acid catalysts. The amount of catalyst employed may range from as little as 0.03% to as much as 0.50% or more by weight on the basis of the cellulosic material being digested. The use of a catalyst permits the digestion to be performed at lower temperatures and in shorter times than when no catalyst is used.

With a catalyst, the digestion reaction may be carried out at a temperature somewhat above the boiling point of water and at atmospheric pressure. Temperatures of from 120° C. to 135° C. are preferred.

Superatmospheric pressures may be used. Where no catalyst is employed, the digestion temperature may be of the order of 250° C. to 350° C. and, especially near or above the normal boiling point of triethylene glycol, 290° C., the reaction is carried out under superatmospheric pressure to prevent loss of triethylene glycol.

The time of digestion will normally range from 1 to 3 hours depending upon various factors such as temperature, pressure, the presence or absence of a catalyst, acidity, type of wood being digested, and the like.

By the process of this invention, cellulosic pulp of excellent quality is prepared in high yield. Yields of from 60% to 65% by weight of cellulose fibers on the basis of the wood are obtained. These high yields are due to low hydrolysis of carbohydrates and hemi-cellulose. Stronger paper can be prepared from the fibers because degradation of the cellulosic components is low. The fibers have a very light color compared to ordinary kraft and bleachability equal to sulfite pulp.

Lignin complex prepared in accordance with this invention has a low melting and flow point ranging from 120° C. to 135° C. It is recovered as a fine light powder ranging in color from light cream gray to brown. Chemically, the lignin complex is very reactive; it condenses with furfural and phenol at room temperature and at elevated temperatures with formalin. It is self-polymerizing at elevated temperatures. It is completely soluble in lower aliphatic alcohols at room temperatures. It is completely soluble at room temperatures (about 70° F.) in a mixture of acetone and water and in dioxane.

The foregoing properties of the lignin complex make it useful as an adhesive for wood and paper; it may be condensed with 10% to 20% of formalin or furfural to provide an adhesive of high strength for making plywood or may be used as a hot-press adhesive without adding condensing agents. The condensed product may be applied in a solvent such as alcohol. Good surface coatings may be prepared from alcoholic solutions of the lignin complex or one of its condensates. It may be molded under heat and pressure and it may be modified with filler and/or plasticizer for this purpose.

The lignin complex is substantially unaffected by water.

We claim:

Process for pulping wood chips which comprises immersing wood chips in a bath of triethylene glycol containing from 0.03% to 0.50% by weight of anhydrous aluminum chloride on the basis of the wood chips, maintaining said bath at a temperature of from about 120° C. to 135° C. for a period of from about 1 to 4 hours at atmospheric pressure, and thereafter separating the cellulosic fibers from the digestion liquor.

References Cited in the file of this patent

UNITED STATES PATENTS

| | | |
|---|---|---|
| 1,658,213 | Strecker | Feb. 7, 1928 |
| 1,806,703 | Ott et al. | May 26, 1931 |
| 2,042,705 | Dreyfus | June 2, 1936 |
| 2,237,295 | Akin | Apr. 8, 1941 |
| 2,308,564 | McKee | Jan. 19, 1943 |
| 2,538,457 | Hudson | Jan. 16, 1951 |
| 2,594,302 | Ehrensperger | Apr. 29, 1952 |
| 2,600,606 | Balon | June 17, 1952 |

FOREIGN PATENTS

| | | |
|---|---|---|
| 581,806 | Germany | Aug. 3, 1933 |

OTHER REFERENCES

Hydrotropic Solutions as Solvents of Lignin, by Pelipetz, pp. 7 and 23 (1937).

Pelipetz: "Hydrotropic Solutions as Solvents of Lignin," 1937, pages 1–36, pages 22–24, 26–27, and 35 especially cited.

Cellulose and Cellulose Derivatives, by Ott, published by Interscience Publishers, Inc., New York (1943), pp. 451–455.

Schutz et al.: Paper Industry and Paper World, August 1943, pp. 558, 559.

Wood Chemistry by Wise, published by Reinhold Publishing Corp., New York (1944), pp. 288, 290, 291, 293.

Brauns, Tappi, 32, 157–160 (April 1949).